(12) United States Patent
Rhee et al.

(10) Patent No.: US 9,449,393 B2
(45) Date of Patent: Sep. 20, 2016

(54) APPARATUS AND METHOD FOR PLANE DETECTION

(71) Applicant: SAMSUNG ELECTRONICS CO., LTD., Suwon (KR)

(72) Inventors: Seon Min Rhee, Seoul (KR); Do Kyoon Kim, Seongnam (KR); Yong Beom Lee, Seoul (KR); Tae Hyun Rhee, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 180 days.

(21) Appl. No.: 13/746,828

(22) Filed: Jan. 22, 2013

(65) Prior Publication Data

US 2013/0188861 A1    Jul. 25, 2013

(30) Foreign Application Priority Data

Jan. 19, 2012 (KR) .................. 10-2012-0006183

(51) Int. Cl.
 G06T 7/00    (2006.01)
 G06T 17/00    (2006.01)

(52) U.S. Cl.
 CPC ........... *G06T 7/0051* (2013.01); *G06T 7/0046* (2013.01); *G06T 17/00* (2013.01); *G06T 2200/08* (2013.01); *G06T 2207/10028* (2013.01); *G06T 2207/20021* (2013.01)

(58) Field of Classification Search
 None
 See application file for complete search history.

(56) References Cited

U.S. PATENT DOCUMENTS

| | | | |
|---|---|---|---|
| 5,978,504 A * | 11/1999 | Leger | 382/153 |
| 6,104,837 A | 8/2000 | Walker | |
| 7,567,727 B2 * | 7/2009 | Kondo | G06T 1/00 382/274 |
| 2005/0286756 A1 * | 12/2005 | Hong | G06K 9/20 382/154 |
| 2010/0208994 A1 * | 8/2010 | Yao | G06T 7/0081 382/173 |
| 2010/0284572 A1 * | 11/2010 | Lukas | G06K 9/00201 382/107 |
| 2011/0080336 A1 * | 4/2011 | Leyvand et al. | 345/156 |
| 2011/0205340 A1 * | 8/2011 | Garcia | G01S 7/4972 348/46 |
| 2011/0234609 A1 * | 9/2011 | Cai | G06T 11/40 345/581 |
| 2012/0062749 A1 * | 3/2012 | Kawahata | G06K 9/00201 348/152 |
| 2012/0154373 A1 * | 6/2012 | Finocchio et al. | 345/419 |
| 2013/0016879 A1 * | 1/2013 | Baele | G06K 9/00201 382/103 |
| 2013/0155047 A1 * | 6/2013 | Williams | G06T 15/205 345/419 |

FOREIGN PATENT DOCUMENTS

DE    WO/2011/128366    * 10/2011    ............... H04N 7/26

(Continued)

*Primary Examiner* — Siamak Harandi
*Assistant Examiner* — Mai Tran
(74) *Attorney, Agent, or Firm* — NSIP Law (57) ABSTRACT

A plane detection apparatus for detecting at least one plane model from an input depth image. The plane detection apparatus may include an image divider to divide the input depth image into a plurality of patches, a plane model estimator to calculate one or more plane models with respect to the plurality of patches including a first patch and a second patch, and a patch merger to iteratively merge patches having a plane model a similarity greater than or equal to a first threshold by comparing plane models of the plurality of patches. When a patch having the plane model similarity greater than or equal to the first threshold is absent, the plane detection apparatus may determine at least one final plane model with respect to the input depth image using previously merged patches.

23 Claims, 5 Drawing Sheets

(56) References Cited

FOREIGN PATENT DOCUMENTS

| JP | 2010-79453 | 4/2010 |
|---|---|---|
| KR | 1999-005286 | 1/1999 |
| KR | 10-2003-0017888 | 3/2003 |
| KR | 10-2005-0008242 | 1/2005 |
| KR | 10-2011-0094957 | 8/2011 |

* cited by examiner

APPARATUS AND METHOD FOR PLANE DETECTION

CROSS-REFERENCE TO RELATED APPLICATIONS

This application claims the priority benefit of Korean Patent Application No. 10-2012-0006183, filed on Jan. 19, 2012, in the Korean Intellectual Property Office, the disclosure of which is incorporated herein by reference.

BACKGROUND

1. Field

Example embodiments of the following disclosure relate to an apparatus and method for detecting a plane model from space information about an object, and more particularly, to an apparatus and method for detecting a plane model associated with an object from a three-dimensional (3D) point cloud associated with the object or a depth image captured from the object.

2. Description of the Related Art

Recently, an interest with respect to modeling of a three-dimensional (3D) space and applications of the modeled 3D space has been increasing. As an example, a method of decomposing a complex space based on a basic primitive may be employed.

For example, an indoor space generally includes planes, such as, walls, ceiling, floor, a desk, and the like. Therefore, a method of detecting and utilizing a plurality of planes present in the space may be efficiently employed in the modeling of the 3D space.

As the related art, a random sample consensus (RANSAC) method has been proposed. The RANSAC method may be employed as a general framework to estimate a model capable of describing observed 3D space data and may also be employed to estimate a plane in a depth image.

The above RANSAC method may estimate a plane model by randomly selecting a minimum number of points required for model estimation, for example, three points in the case of a plane, and may determine that the estimated plane model is a final plane model when the number of points supported by the estimated plane model is greater than or equal to a predetermined threshold.

However, the RANSAC method may be valid when a plane exists within a 3D space that includes a single plane instead of a plurality of planes. Further, the RANSAC method may be invalid in a plane model of the 3D space that includes a plurality of planes.

Other variation methods of estimating a plurality of planes, for example, a sequential RANSAC method, a multi-RANSAC method, and the like, have been introduced, however, may not provide the optimal solution or may require a user to pre-designate the number of planes. In particular, the variation methods may be unreliable in terms of 3D information in which noise exists.

Therefore, there is a need for an improved method and apparatus for plane detection.

SUMMARY

The foregoing and/or other aspects are achieved by providing an apparatus for plane detection, including an image divider to divide an input depth image into a plurality of patches, a plane model estimator to calculate one or more plane models with respect to the plurality of patches including a first patch and a second patch, and a patch merger to merge the first patch and the second patch by comparing the plane models of the plurality of patches.

The plane detection apparatus may further include a noise removal unit to remove a noise pixel from the input depth image or the plurality of patches.

The patch merger may calculate a normal vector of for the plane model of the first patch and a normal vector for the plane model of the second patch, and may merge the first patch and the second patch when an inner product of the calculated normal vectors is greater than or equal to a first threshold.

The patch merger may calculate a difference between an average depth value for the plane model of the first patch and an average depth value for the plane model of the second patch, and may merge the first patch and the at least one second patch when the difference is less than or equal to a second threshold.

The patch merger may merge the first patch and the second patch when a distance between a position of the first patch and a position of the second patch within the input depth image is less than or equal to a third threshold.

The plane detection apparatus may further include a valid patch selector to classify the first patch or the second patch as a valid patch for the merging when a matching level between pixels belonging to the first patch or the second patch and a plane model of the first patch or the second patch is less than or equal to a fourth threshold.

The matching level between the pixels belonging to the third patch and the plane model of the third patch may be determined by an R-squared ($R^2$) test.

The plane model estimator may calculate a new plane model of a super patch that is generated as the merging result.

The plane detection apparatus may further include a consensus set configuring unit to configure a consensus set that is a set of pixels satisfying the new plane model of the super patch among the pixels of the input depth image.

The plane model estimator may refine the new plane model of the super patch using the pixels included in the consensus set that is configured in correspondence to the super patch.

The foregoing and/or other aspects are achieved by providing an apparatus for plane detection, including an image divider to divide an input depth image into a plurality of patches, a plane model estimator to calculate one or more plane models with respect to the plurality of patches including a first patch and a second patch, and a patch merger to iteratively merge patches having a plane model similarity greater than or equal to a first threshold by comparing plane models of the plurality of patches. The patch merger may determine at least one final plane model with respect to the input depth image using previously merged patches when a patch having the plane model similarity greater than or equal to the first threshold is absent.

The foregoing and/or other aspects are achieved by providing a method of detecting, by a plane detection apparatus, at least one plane model with respect to an input depth image, the method including dividing, by an image divider of the plane detection apparatus, an input depth image into a plurality of patches, calculating, by a plane model estimator of the plane detection apparatus, one or more plane models with respect to the plurality of patches including a first patch or a second patch, and merging, by a patch merger of the plane detection apparatus, the first patch and the second patch by comparing the plane models of the plurality of patches.

The foregoing and/or other aspects are achieved by providing a method for plane detection, the method including: estimating plane models for a plurality of patches of a depth image; merging, iteratively, the plurality of patches based on a comparison of the estimated plane models; and generating a final merging result based on the merged plurality of patches.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
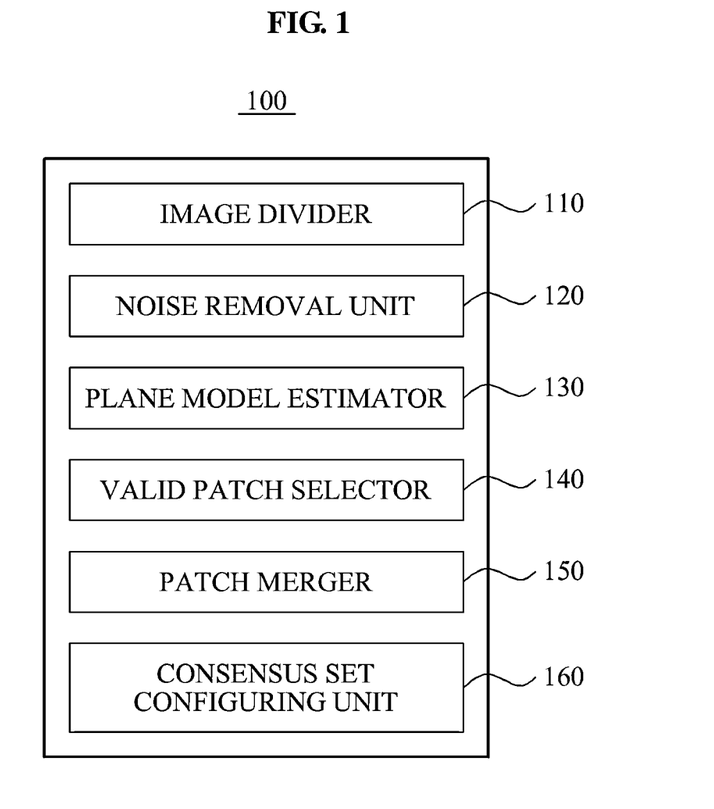
FIG. 1 illustrates a plane detection apparatus, according to an example embodiment.

FIG. 1 illustrates a plane detection apparatus 100, according to an example embodiment of the present disclosure.

An image divider 110 of the plane detection apparatus 100 may divide an input depth image into a plurality of patches.

The term "patch" may be understood as a unit area that is generated by dividing the input depth image, and may also be understood as a block, a tile, and the like. In addition, patches may have the same size, and may also have different sizes from each other depending on embodiments.

Accordingly, the range of a process described in embodiments should not be limitedly interpreted by the term "patch" and also not be interpreted to only a case in which all of the patches have the same size.

Any other terms or modifications understandable by those skilled in the art from the present specification and the claims should not be exclusively interpreted.

As an example, the input depth image may be one example of a point cloud of a three-dimensional (3D) space that is input using anyhow method. Data including geometric information of the 3D space may be input to the plane detection apparatus 100 and be utilized for plane detection through the following process.

Accordingly, even though content in which a depth image is input to the plane detection apparatus 100 and plane detection is performed is described as an example, data input to the plane detection apparatus 100 may need to be interpreted to include the depth image and geometric information of the 3D space in the following description.

When input data is the depth image, the depth image may be acquired from, for example, a laser scanner, a ranger, sensor, a depth sensor or a depth camera, and the like. In addition, the depth image may be indirectly acquired from a plurality of color images that is acquired by photographing the same 3D space at different points of views.

A process of dividing a depth image, according to an example embodiment, will be further described with reference to FIG. 2 hereinafter.

When the image divider 110 divides the input depth image into the plurality of patches, a noise removal unit 120 may perform noise removal with respect to pixels of the input depth image included in each of the plurality of patches. A noise removal process will be further described with reference to FIG. 3 hereinafter.

A plane model estimator 130 may detect an individual plane model corresponding to each of the plurality of patches by estimating a plane model with respect to each of the plurality of patches. During the above process, the number of plane models corresponding to the number of patches generated by dividing, by the image divider 110, the input depth image may be detected. A process of detecting a plane model with respect to each of the plurality of plane models will be further described with reference to FIG. 4 hereinafter.

A portion of the plurality of patches may correspond to a planar portion that is an actual plane shape, and another portion of the plurality of patches may correspond to an edge or a valley at which a plane and another plane intersect, or a non-planar portion, such as, a curved surface.

In this case, a valid patch selector 140 may remove non-planar patches during the plane detection process without performing the plane detection with respect to the patches. The above non-plane detection will be further described with reference to FIG. 4.

In a state in which the valid patch selector 140 selects only planar patches, a patch merger 150 may merge, into a single super patch, patches that are determined to be similar planes by comparing individual plane models of the plurality of patches. As such, a single super patch may include at least one patch.

During the above process, a plane model similarity may be compared by calculating an inner product of a normal vector with respect to plane models of individual patches. The normal vector may refer to a vector that has a magnitude of "1" and that provides normal direction information of a plane model. When an inner product between two patches of which merging is to be determined is greater than or equal to a predetermined threshold, for example, "0.8", the two patches may be determined to be the same plane. For example, the two patches may be an initial patch, and may also be a super patch generated by merging a plurality of patches.

According to an example embodiment, a distance between target patches may be utilized to determine whether to merge two patches. Even though patches spaced apart from each other have a similar normal vector direction, the patches spaced apart from each other may be different planes.

According to another example embodiment, the averages of depth values within patches may be compared to merge two patches. For example, a depth value may denote a value of a Z-axial direction. Noise is already removed and thus, whether patches belong to the same plane may be determined based on the average of pixels within the patches.

When patches are merged into a super patch through the above patch merging process, the plane model estimator 130 may estimate a plane model of the super patch by applying all of the pixels included in the merged super patch.

A consensus set configuring unit 160 may configure a consensus set with respect to the plane model of the super patch and the entire input depth image. The plane model estimator 130 may refine the plane model of the super patch using the consensus set.

The above process may be recursively repeated until a pair of patches to be merged is no longer present. When all of the merging is completed, the plane model estimator 130 may determine a final plane model with respect to each of the super patches remaining after merging is completed.

According to an example embodiment, a plane model of a 3D space may be quickly and accurately estimated from a depth image or a point cloud. Even though noise may be included in the depth image or the point cloud, a reliable plane model may be estimated.

A process of configuring a consensus set, and estimating and refining a plane model using the consensus set will be further described with reference to FIG. 5 and FIG. 6 hereinafter.

Figure 2:
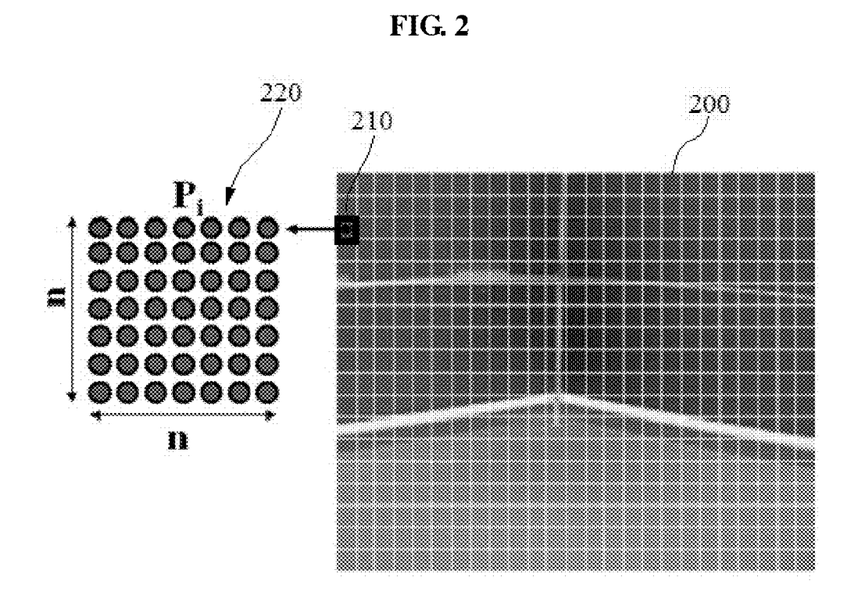
FIG. 2 illustrates a diagram to describe a process of dividing, by an image divider of a plane detection apparatus, a depth image, according to an example embodiment.

FIG. 2 illustrates a diagram to describe a process of dividing, by the image divider 110 of the plane detection apparatus 100, a depth image 200, according to an example embodiment.

When the depth image 200 is input, the image divider 110 may divide the depth image 200 into a plurality of patches.

Each of the plurality of patches, for example, a patch 210 may include n×n pixels 220. For example, n denotes a natural number. Again, as discussed above, the patches of FIG. 2 may be of irregular sizes, different from each other, dependent on embodiments.

Figure 3:
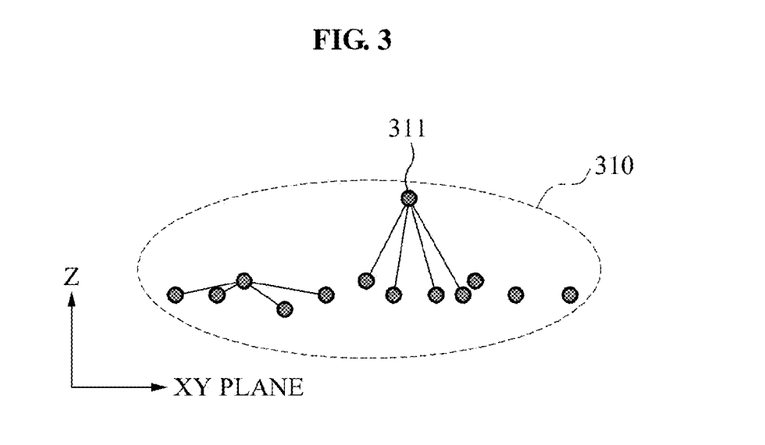
FIG. 3 illustrates a diagram to describe a process of removing, by a noise removal unit of a plane detection apparatus, a noise pixel within a patch, according to an example embodiment.

FIG. 3 illustrates a diagram to describe a process of removing, by the noise removal unit 120 of the plane detection apparatus 100, a noise pixel within a patch, according to an example embodiment.

In general, a noise pixel may be present in a depth image due to a variety of reasons, for example, an optical characteristic of an infrared ray utilized to acquire the depth image, reaction of a sensor according to an infrared ray present in the nature, depth folding, and the like.

Accordingly, the noise removal unit 120 may remove noise pixels present in a depth image, thereby enhancing accuracy of plane model estimation. As described above, the noise removal unit 120 may remove noise after the above patch division operation of the image divider 110, and may also remove noise in the depth image even before the patch division operation, depending on embodiments.

As shown in FIG. 3, a noise removal process of the noise removal unit 120 may be understood as a process of removing an outlier pixel 311 from pixels 310 present within a patch.

A value of a Z-axial direction orthogonal to an X-Y plane may be a depth value of the pixels 310. A depth value of the outlier pixel 311 may be significantly different from a depth value of other pixels. Accordingly, as an example, a pixel having a depth value beyond the average depth value of the pixels 310 by at least a predetermined threshold may be removed as noise.

Depending on embodiments, the above noise removal process may be performed using a method of correcting the depth value of the outlier pixel 311 to be around the average depth value of the pixels 310, and the like.

Alternatively, according to another example embodiment, the outlier pixel 311 may be removed without being applied during all of the subsequent processes, such as, a plane model estimation process, and the like.

When the above noise removal process is performed, the plane model estimator 130 may estimate a plane model of each of individual patches that are not merged yet.

Assuming that pixels present within one individual patch are positioned on the same plane during the above process, a plane model capable of representing the individual patch may be estimated.

More specifically, when a set of pixels within any one predetermined patch in which noise removal is completed is referred to as $\overline{X}_i$, an estimate of the plane model (hereinafter, a plane hypothesis) may be calculated using $\hat{x}_k(x_k, y_k, z_k) \in \overline{X}_i$. As an example of calculating the plane hypothesis, a least square fitting (LSF) process included in the following Equation 1 may be employed.

$$A_i = \begin{bmatrix} \sum_{k=1}^{\overline{n}_p} x_k \cdot x_k & \sum_{k=1}^{\overline{n}_p} x_k \cdot y_k & \sum_{k=1}^{\overline{n}_p} x_k \\ \sum_{k=1}^{\overline{n}_p} x_k \cdot y_k & \sum_{k=1}^{\overline{n}_p} y_k \cdot y_k & \sum_{k=1}^{\overline{n}_p} y_k \\ \sum_{k=1}^{\overline{n}_p} x_k & \sum_{k=1}^{\overline{n}_p} y_k & \sum_{k=1}^{\overline{n}_p} \overline{n}_p \end{bmatrix},$$

[Equation 1]

$$b_i = \begin{bmatrix} \sum_{k=1}^{\overline{n}_p} x_k \cdot z_k & \sum_{k=1}^{\overline{n}_p} y_k \cdot z_k & \sum_{k=1}^{\overline{n}_p} z_k \end{bmatrix}^T,$$

$$X = \begin{bmatrix} n_a & n_b & n_c \end{bmatrix}^T.$$

In Equation 1, $\overline{n}_p$ denotes the number of elements present within $\overline{X}_i$ that is a set of non-noise pixels of an $i^{th}$ patch. A linear equation with respect to $A_i$ and $b_i$ may be expressed by the following Equation 2.

$$A_i x = b_i \qquad \text{[Equation 2]}$$

A solution X that satisfies Equation 2 may be utilized as a coefficient of the following Equation 3, which is a plane equation.

$$f(x,y) = n_a X = n_b Y + n_c \qquad \text{[Equation 3]}$$

A plane model with respect to each of the patches may be estimated through the above process. Next, the valid patch selection process, the patch merging process, the consensus set configuration process, and the like, described above with reference to FIG. 1 may be iteratively performed in any order.

Figure 4:
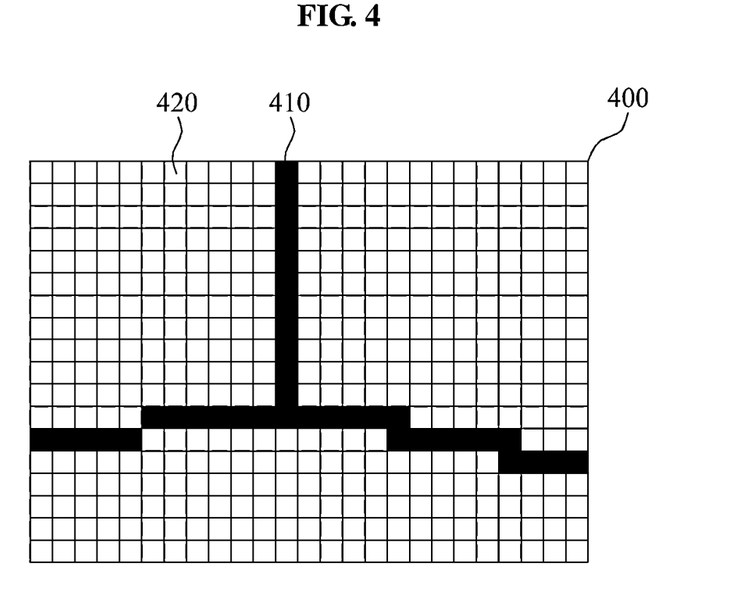
FIG. 4 illustrates a diagram to describe a process of removing, by a valid patch selector of a plane detection apparatus, non-planar patches, according to an example embodiment.

FIG. 4 illustrates a diagram to describe a process of removing, by the valid patch selector 140 of the plane detection apparatus 100, non-planar patches, according to an example embodiment.

When estimating a plane model of each of individual patches, a plane hypothesis may be calculated based on the assumption that a single patch corresponds to a single plane.

However, in the case of a patch corresponding to a corner portion at which a plane and a plane meet each other in an actual 3D space, and the like, a plurality of planes may be present within a corresponding patch and a plane may be absent within the patch.

Accordingly, the valid patch selector 140 may select only a planar patch from among all of the patches as a valid patch. Non-planar patches may be classified as invalid patches and may be subsequently removed, for example, during the following patch merging process and plane model estimation process.

According to an example embodiment, the valid patch selector 140 may remove non-planar patches using an R-squared ($R^2$) test, a coefficient of determination, and the like.

The $R^2$ test is a method for determining the suitability of depth values of noise-removed pixels within a predetermined patch, which are observed data, with respect to an estimated plane model of the predetermined patch.

The $R^2$ test may select only a patch that passes a test as a valid patch that is a planar patch, by assuming that point clouds of pixels included in a predetermined patch constitute a single plane and by determining whether an estimated plane model reflects at least a predetermined level of pixel values corresponding to actual observed data. The $R^2$ test may be performed, according to Equation 4, shown below.

$$\dot{z}_k = \frac{-(a_i x_k + b_i y_k + d_i)}{c_i},$$
$$S_e = \sum_{k=1}^{n_p} (z_k - \dot{z}_k)^2,$$
$$S_i = \sum_{k=1}^{n_p} (z_k - \bar{z})^2,$$
$$R^2 = 1 - \frac{S_e}{S_i},$$
[Equation 4]

$z'_k$ included in Equation 4 denotes a depth value according to a plane hypothesis that is calculated with respect to any one patch. Equation 4 may also establish a relationship as expressed by Equation 5 shown below.

$$\bar{Z} = \frac{1}{\bar{n}_p} \sum_{k=1}^{n_p} z_k$$
[Equation 5]

A relationship of $\hat{x}_k(x_k, y_k, z_k) \in \bar{X}_i$ may also be established. When observed data accurately fits the estimated plane mode, $R^2$ of Equation 4 may become "1". As $R^2$ becomes closer to "1", a corresponding patch may be understood to have successfully modeled a portion of the 3D space that is an actual plane. In the $R^2$ test, as a test pass condition, only in a case in which $R^2$ is greater than or equal to a predetermined threshold, for example, "0.9", which is close to "1", a corresponding patch may be determined to have passed the test.

A patch that has failed in the test may be classified as an invalid and non-planar patch, and thus, may be removed during a subsequent process.

Among patches 400 of FIG. 4, a patch 420 may be a valid patch that has passed the test, and block patches, for example, a patch 410 may be a patch that has failed in the test.

When the valid patch selection process is completed, a super patch generation process using merging between patches may be initiated. For example, the above valid patch selection process may also be performed during a subsequent process, and thus, non-planar patches may be additionally removed, depending on embodiments.

Figure 5:
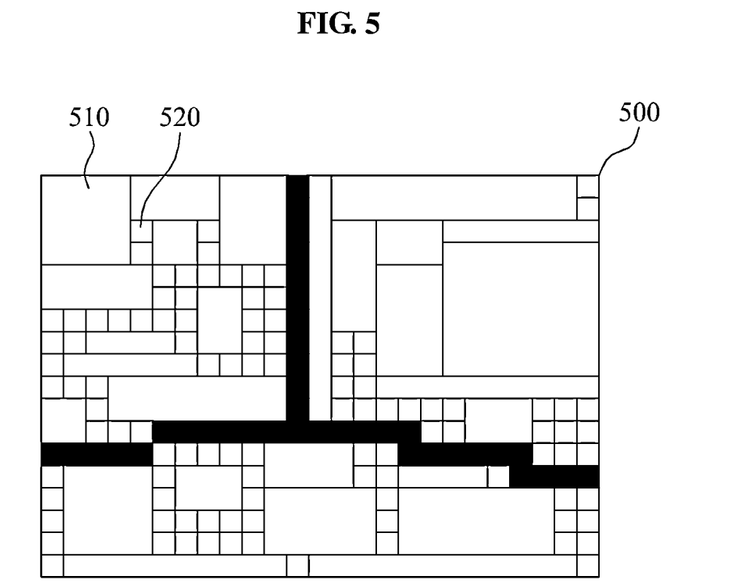
FIG. 5 and FIG. 6 illustrate diagrams to describe a process of merging, by a patch merger of a plane detection apparatus, patches and configuring, by a consensus set configuring unit, a consensus set, according to an example embodiment.
Figure 6:
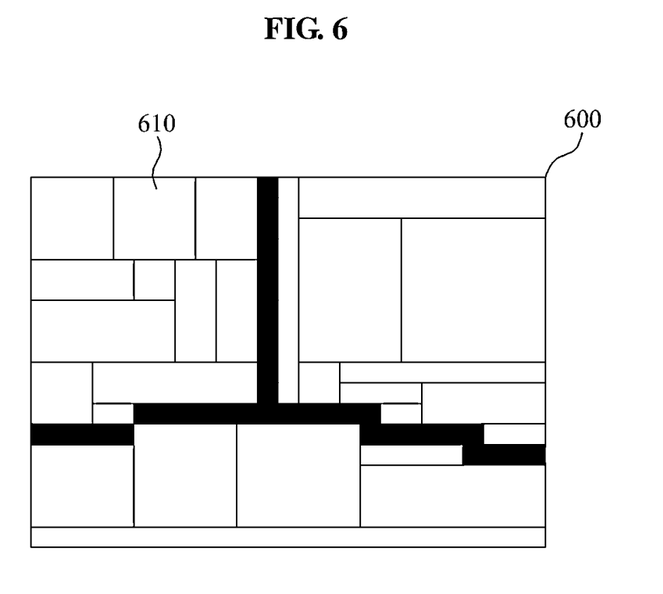

FIG. 5 and FIG. 6 illustrate diagrams to describe a process of merging, by the patch merger 150 of the plane detection apparatus 100, patches and configuring, by the consensus set configuring unit 160, a consensus set, according to an example embodiment.

The patch merger 150 may iteratively merge similar planar patches until patches to be merged become absent by verifying patches present in the same or similar planar space.

The patch merger 150 may determine whether patches to be merged are present using the following method, for example.

In any operation in which patch merging is iteratively performed, the patch merger 150 may verify whether the number of plane hypotheses in a previous iterative operation is equal to the number of plane hypotheses in the present operation.

When the number of plane hypotheses in the previous iterative operation is equal to the number of plane hypotheses in the present operation, the patch merger 150 may determine that similar patches to be merged are absent and then suspend an iteration. On the contrary, when the number of plane hypotheses in the previous iterative operation is different from the number of plane hypotheses in the present operation, the patch merger 150 may determine that patches to be merged are present, and thus, may perform a subsequent iteration.

The patch merger 150 may determine a plane model similarity between patches, and may generate a super patch by merging patches having the same plane model similarity or the plane model similarity greater than or equal to a predetermined threshold. A super patch 510 of FIG. 5 may be generated by merging a plurality of patches through the above process.

In the case of determining the plane model similarity, when a plane hypothesis of an $i^{th}$ patch is $\Pi_i = (n_i, d_i)$, $n_i = (a_i, b_i, c_i)$ may be defined as a normal vector of a plane and $d_i$ may be defined as a distance from the plane to the starting point.

A comparison between the $i^{th}$ patch and a $j^{th}$ patch may be understood as a process of determining a direction difference between normal vectors through inner product calculation ($\epsilon_n(n_i, n_j) = n_i \cdot n_j$), or by calculating a distance difference from the starting point ($\epsilon_d(d_i, d_j) = |d_i - d_j|$) and thereby determining whether each value is less than a predetermined threshold.

The above process may refer to the embodiment that relates to whether to merge patches, described above with reference to FIG. 1. As described above, a distance between patches may also be utilized during the above process.

A patch 520 among patches 500 of FIG. 5 may be merged with a super patch and be included in a super patch 610 among patches 600 of FIG. 6.

Using pixels within the merged super patches instead of using noise pixels, the plane model estimator 130 may estimate a new plane model that represents all of the super patches. The above process may be understood to refine a plane model of each of patches before being merged. During the above process, the plane model calculation process followed by Equation 1 may be performed. When applying the plane model calculation process followed by Equation 1, $\hat{x}_k(x_k, y_k, z_k) \in \bar{X}_i$ may denote non-noise pixels within a merged super patch, and $\bar{n}_p$ may be replaced with the number of non-noise pixels within the super patch.

According to an example embodiment, the consensus set configuring unit 160 may configure a consensus set that is a set of points satisfying the refined plane model of the super patch.

In addition to a point within a predetermined patch or a predetermined super patch, a point cloud that is a set of non-noise depth pixels within the entire depth image may become a target of a consensus set configuration during the above process.

The consensus set may be understood as a set that applies all of the corresponding consensuses when vertical distances of non-noise pixels within the entire depth image from a plane by a plane hypothesis of the predetermined patch or the predetermined super patch are less than or equal to a predetermined threshold.

The above process may be understood as a plane model refinement process that is performed based on the assumption that a plane model of the predetermined patch or the predetermined super patch may not reflect a plane of an actual 3D space.

Utilized herein is an aspect that pixels present on the same plane as the predetermined patch or the predetermined super patch may be present within another patch or another super patch in addition to the predetermined patch or the predetermined super patch that is a target of the consensus set configuration.

Accordingly, by configuring, as the consensus set, all of the pixels having a close vertical distance with respect to a plane by a current plane hypothesis among all of the pixels of the depth image and by utilizing all of the pixels of the consensus set, the plane model of the predetermined patch or the predetermined super patch may be calculated again.

The plane model refinement process followed by the consensus set configuration process may also utilize equations followed by Equation 1 as is for the plane model estimation.

Hereinafter, a plane model estimation process using a consensus set will be described.

A plane model may be refined using the consensus set. For example, Equation 1 may be employed. $\hat{x}_k(x_k, y_k, z_k) \in \bar{X}_i$ may denote non-noise pixels within the consensus set, and $\bar{n}_p$ may be replaced with the number of non-noise pixels within the consensus set.

As described above, when the above process is iteratively performed until patches and super patches to be merged are determined to be absent, the plane model refinement process, according to the patch merging and consensus configuration process, may be completely terminated and final plane models may be determined.

Figure 7:
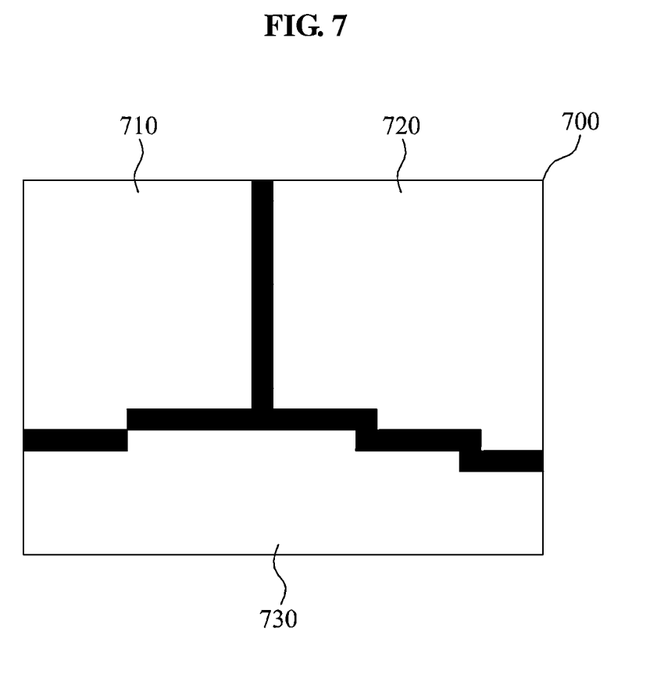
FIG. 7 illustrates a diagram to describe a result of performing a final plane detection with respect to the depth image of FIG. 2, according to an example embodiment.

FIG. 7 illustrates a diagram to describe a result of performing a final plane detection with respect to the depth image 200 of FIG. 2, according to an example embodiment.

Only planes 710, 720, and 730 that fit the depth image 200 may remain as final planes. The plane model estimator 130 may re-calculate a plane model with respect to each of the final plane models, for example, the planes 710, 720, and 730.

The aforementioned thresholds may vary depending on settings and may also be predicted through a simple and iterative test.

Figure 8:
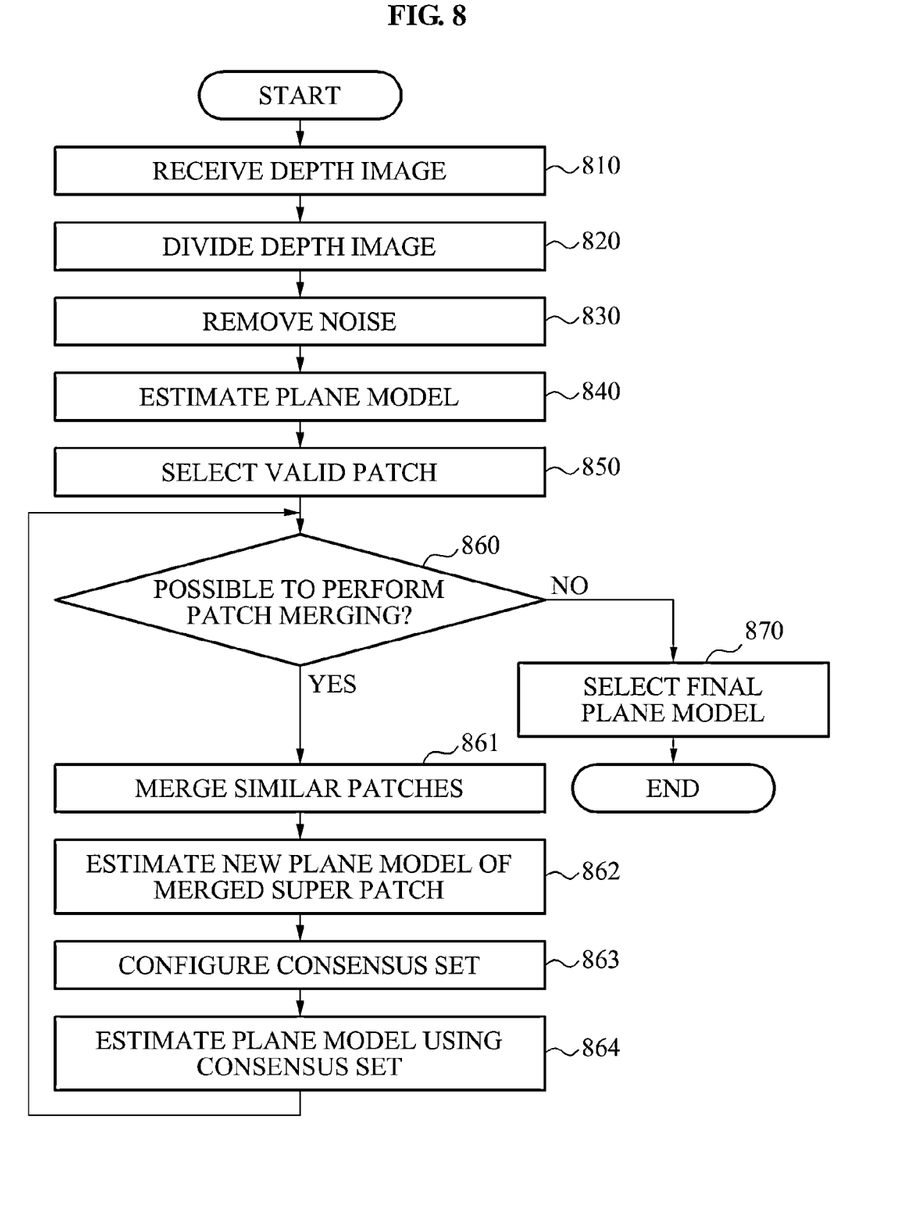
FIG. 8 is a flowchart illustrating a plane detection method, according to an example embodiment.

FIG. 8 is a flowchart illustrating a plane detection method, according to an example embodiment.

In operation 810, an input depth image may be received.

In operation 820, the image divider 110 of the plane detection apparatus 100 may divide the input depth image into a plurality of patches. The process of dividing the input depth image is described above with reference to FIG. 1 and FIG. 2, and thus, a further detailed description will be omitted here.

In operation 830, the noise removal unit 120 may perform noise removal with respect to pixels of the input depth image that are included in each of the plurality of patches. Depending on embodiments, the noise removal of operation 830 may be performed before the dividing of the image into patches of operation 820. The noise removal process is described above with reference to FIG. 1 and FIG. 3, and thus, a further detailed description will be omitted here.

In operation 840, the plane model estimator 130 may estimate a plane model with respect to each of the plurality of patches. The plane model estimation process is described above with reference to FIG. 1 and FIG. 4, and thus, a further detailed description will be omitted here.

In operation 850, the valid patch selector 140 may remove non-planar patches and may select only planar patches as valid patches. The valid patch selection process is described above with reference to FIG. 1 and FIG. 4, and thus, a further detailed description will be omitted here.

In operation 860, the patch merger 150 may determine whether it is possible to perform patch merging. When patches, corresponding to the same or similar plane, to be merged are present, the patch merger 150 may perform operations 861 through 864.

In operation 861, the patch merger 150 may merge similar patches. When a super patch is generated by merging the patches, a new plane model of the merged super patch may be estimated in operation 862. When a consensus set is configured in operation 863, estimation or refinement of the plane model may be performed again using the consensus set in operation 864.

The above similar patch merging process, consensus set configuration process, and plane model refinement process are described above with reference to at least FIG. 1, FIG. 5, and FIG. 6, and thus, a further detailed description will be omitted here.

When patches to be merged are determined to be absent in operation 860, a final plane model may be determined in operation 870. The above process is described above with reference to FIG. 7. According to an example embodiment, a plane model with respect to each of the final plane models may be refined again during the above process.

The plane detection method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), a USB memory, and a CD-R (Recordable)/RW.

Further, according to an aspect of the embodiments, any combinations of the described features, functions and/or operations can be provided.

Moreover, the apparatus for plane detection may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for plane detection, comprising:
   an image divider, including at least one processing device, configured to divide an input depth image into a plurality of patches;
   a plane model estimator configured to calculate a plane model for each of the plurality of patches; and
   a patch merger configured to compare plane models of each of the plurality of patches, detect that two or more patches of the plurality of patches comprise plane models with a similarity greater than or equal to a first threshold, and
   iteratively merge the detected two or more patches by verifying whether a number of plane hypotheses in a previous iterative operation is equal to a number of plane hypotheses in the present operation, wherein a plane hypothesis is an estimate of a plane model.

2. The apparatus of claim 1, further comprising:
   a noise removal device configured to remove a noise pixel from at least one of the input depth image and the plurality of patches.

3. The apparatus of claim 1, wherein the patch merger calculates a normal vector for a plane model of a first patch among the plurality of patches and a normal vector for a plane model of a second patch among the plurality of patches, and merges the first patch and the second patch when an inner product of the calculated normal vectors of the first patch and the second patch is greater than or equal to the first threshold.

4. The apparatus of claim 1, wherein the patch merger calculates a difference between an average depth value for a plane model of a first patch among the plurality of patches and an average depth value for a plane model of a second patch among the plurality of patches, and merges the first patch and the second patch in response to the calculated difference being less than or equal to the first threshold.

5. The apparatus of claim 1, wherein the patch merger does not merge a first patch and a second patch when a distance between a position of the first patch and a position of the second patch within the input depth image is greater than or equal to a second threshold.

6. The apparatus of claim 1, further comprising:
   a valid patch selector configured to classify a patch among the plurality of patches as a valid patch for the merging when a matching level between pixels belonging to the patch and a plane model of the patch is less than or equal to a third threshold.

7. The apparatus of claim 6, wherein the matching level between the pixels belonging to the patch and the plane model of the patch is determined by an R-squared ($R^2$) test.

8. The apparatus of claim 1, wherein the plane model estimator calculates a new plane model of a super patch that is generated as the merging result.

9. The apparatus of claim 8, further comprising:
   a consensus set configuring device configured to configure a consensus set that is a set of pixels satisfying the new plane model of the super patch among the pixels of the input depth image.

10. The apparatus of claim 9, wherein the plane model estimator refines the new plane model of the super patch using the pixels included in the consensus set that is configured in correspondence to the super patch.

11. An apparatus for plane detection, comprising:
    an image divider, including at least one processing device, configured to divide an input depth image into a plurality of patches;
    a plane model estimator configured to calculate a plane model for each of the plurality of patches;
    a valid patch selector to classify patches, among the plurality of patches, comprising either no planes or more than one plane as invalid patches, and to classify patches, among the plurality of patches, comprising a single plane as valid patches; and
    a patch merger configured to iteratively merge patches having a plane model similarity greater than or equal to a first threshold based on a comparison between the plurality of plane models of the plurality of patches by verifying whether a number of plane hypotheses in a previous iterative operation is equal to a number of plane hypotheses in the present operation, wherein a plane hypothesis is an estimate of a plane model.

12. The apparatus of claim 11, wherein the patch merger determines at least one final plane model with respect to the input depth image using the merged patches when a patch having the plane model similarity greater than or equal to the first threshold is absent.

13. A method of detecting, by a plane detection apparatus, at least one plane model with respect to an input depth image, the method comprising:
    dividing, by an image divider, an input depth image into a plurality of patches;
    calculating, by a plane model estimator, a plane model for each of the plurality of patches;
    comparing, by a patch merger, plane models of each of the plurality of patches;
    detecting, by the patch merger, that two or more of the plurality of patches comprise plane models with a similarity greater than or equal to a first threshold; and
    iteratively merging, by the patch merger, the detected two or more patches by verifying whether a number of plane hypotheses in a previous iterative operation is equal to a number of plane hypotheses in the present operation, wherein a plane hypothesis is an estimate of a plane model.

14. The method of claim 13, further comprising:
    removing, by a noise removal unit, a noise pixel from the input depth image or the plurality of patches.

15. The method of claim 13, wherein the merging comprises calculating a normal vector for a plane model of a first patch among the plurality of patches and a normal vector for a plane model of a second patch among the plurality of patches, and merging the first patch and the second patch when an inner product of the calculated normal vectors of the first patch and the second patch is greater than or equal to the first threshold.

16. The method of claim 13, further comprising:
classifying, by a valid patch selector, a patch among the plurality of patches as a valid patch for the merging when a matching level between pixels belonging to the patch and a plane model of the patch is less than or equal to a predetermined threshold.

17. The method of claim 13, further comprising:
calculating, by the plane model estimator, a new plane model of a super patch that is generated as the merging result;
configuring, by a consensus set configuring unit, a consensus set that is a set of pixels satisfying the new plane model of the super patch among the pixels of the input depth image; and
refining, by the plane model estimator, the new plane model of the super patch using the pixels included in the consensus set that is configured in correspondence to the super patch.

18. A non-transitory computer-readable medium comprising a program for instructing a computer to perform the method of claim 13.

19. A method for plane detection, the method comprising:
estimating a plane model for each of a plurality of patches of a depth image;
comparing plane models of each of the plurality of patches;
detecting, by the patch merger, that two or more of the plurality of patches comprise plane models with a similarity greater than or equal to a first threshold;
merging, iteratively, the detected two or more patches; and
generating a final merging result based on the merged patches by verifying whether a number of plane hypotheses in a previous iterative operation is equal to a number of plane hypotheses in the present operation, wherein a plane hypothesis is an estimate of a plane model.

20. The method of claim 19, wherein the merging comprises calculating a normal vector for a plane model of a first patch among the plurality of patches and a normal vector for a plane model of a second patch among the plurality of patches, and merging the first patch and the second patch when an inner product of the calculated normal vectors of the first patch and the second patch is greater than or equal to the first threshold.

21. The apparatus of claim 1, wherein the patch merger iteratively merges the detected two or more patches until patches to be merged become absent.

22. The apparatus of claim 1, wherein a first plane model of a first patch among the plurality of patches is compared with a second plane model of a second patch among the plurality of patches, and the patch merger merges the first and second patches based on the compared first plane model and second plane model.

23. The apparatus of claim 1, wherein the patch merger merges patches among the detected two or more patches that are determined to be similar planes into a single super patch by comparing individual plane models of respective patches, and a plane model is estimated for the super patch.

* * * * *